United States Patent
Barron et al.

(10) Patent No.: US 9,242,876 B2
(45) Date of Patent: Jan. 26, 2016

(54) METHODS, SYSTEMS AND MEMBRANES FOR SEPARATION OF ORGANIC COMPOUNDS FROM LIQUID SAMPLES

(75) Inventors: Andrew R. Barron, Houston, TX (US); Samuel J. Maguire-Boyle, Drogheda (IE)

(73) Assignee: WILLIAM MARSH RICE UNIVERSITY, Houston, TX (US)

( * ) Notice: Subject to any disclaimer, the term of this patent is extended or adjusted under 35 U.S.C. 154(b) by 1133 days.

(21) Appl. No.: 13/087,706

(22) Filed: Apr. 15, 2011

(65) Prior Publication Data

US 2012/0261343 A1 Oct. 18, 2012

(51) Int. Cl.
*C02F 1/44* (2006.01)
*B01D 63/06* (2006.01)
*B01D 69/02* (2006.01)
*B01D 67/00* (2006.01)
(Continued)

(52) U.S. Cl.
CPC .............. *C02F 1/444* (2013.01); *B01D 63/066* (2013.01); *B01D 67/0088* (2013.01); *B01D 69/02* (2013.01); *B01D 2323/02* (2013.01); *B01D 2325/36* (2013.01); *C02F 2101/32* (2013.01); *C02F 2103/08* (2013.01)

(58) Field of Classification Search
CPC .. C02F 1/444; C02F 2101/32; C02F 2103/08; B01D 63/066; B01D 67/0088; B01D 69/02; B01D 2323/02; B01D 2325/36
USPC ................................................ 210/651, 653
See application file for complete search history.

(56) References Cited

U.S. PATENT DOCUMENTS

| 5,520,815 A | 5/1996 | El-Shoubary et al. |
| 7,655,277 B2 | 2/2010 | Lee et al. |
| 7,867,417 B2 | 1/2011 | Mullette |

(Continued)

FOREIGN PATENT DOCUMENTS

JP 2009-255031 A * 10/2008

OTHER PUBLICATIONS

Vogelson et al., Molecular coupling layers formed by reactions of epoxy resins with self-assembled carboxylate monolayers grown on the native oxide of aluminum, J. Mater. Chem., 13 (2003) 291-296.

(Continued)

*Primary Examiner* — Fred Prince
(74) *Attorney, Agent, or Firm* — Winstead PC

(57) ABSTRACT

Various aspects of the present invention pertain to porous membranes that comprise: (1) a plurality of pores with pore sizes of more than about 0.1 µm in diameter; and (2) a plurality of hydrophilic molecules. Additional aspects of the present invention pertain to methods of separating organic compounds from a liquid sample by: (1) providing the porous membrane; and (2) flowing the liquid sample through the porous membrane in order to retain organic compounds on the porous membrane. Further aspects of the present invention pertain to systems for separating organic compounds from a liquid sample. Such systems comprises: (1) the porous membrane; and (2) a flowing unit that enables the liquid sample to flow through the porous membrane. Additional aspects of the present invention pertain to methods of making the above-described porous membranes by: (1) coating a surface of a porous membrane containing 0.1 µm pores with a ceramic material; and (2) associating the coated surface of the porous membrane with hydrophilic molecules.

28 Claims, 12 Drawing Sheets

(51) Int. Cl.
*C02F 101/32* (2006.01)
*C02F 103/08* (2006.01)

(56) References Cited

U.S. PATENT DOCUMENTS

| 7,913,857 | B2 | 3/2011 | Koo et al. | |
|---|---|---|---|---|
| 2003/0094409 | A1* | 5/2003 | Minegishi et al. | 210/500.23 |
| 2004/0256309 | A1* | 12/2004 | Tomioka et al. | 210/490 |

OTHER PUBLICATIONS

Callender et al., Aqueous synthesis of water soluble alumoxanes: environmentally benign precursors to alumina and aluminum-based ceramics, Chem. Mater., 9 (1997) 2418-2433.
Callender et al., Facile synthesis of aluminum containing mixed metal oxides using doped carboxylate-alumoxane nanoparticles, J. Am. Ceram. Soc., 83 (2000) 1777.
Shahid et al., Solvent free synthesis of carboxylate-alumoxane nanoparticles using mechanical shear, J. Mater. Chem., 14 (2004) 1235-1237.
Bailey et al., Characterization of alumoxane-derived ceramic membranes. J. Membrane Sci., 2000, 176, 1-9.
Jones et al., Alumina ultrafiltration membranes derived from carboxylate-alumoxane nanoparticles, J. Membrane Sci., 2001, 193, 175-184.
Defriend et al., Alumina and aluminate ultrafiltration membranes derived from alumina nanoparticles. J. Membrane Sci., 2003, 224, 11-28.
Defriend et al., A simple approach to hierarchical ceramic ultrafiltraion membranes. J. Membrane Sci., 2003, 212, 29-38.
Cortalezzi et al., Characteristics of ultrafiltration ceramic membranes derived from alumoxane nanoparticles. J. Membrane Sci., 2002, 205, 33-43.
Cortalezzi et al., Ceramic membranes derived from ferroxane nanoparticles: a new route to the fabrication of iron oxide ultrafiltration membranes. J. Membrane Sci., 2003, 227, 207-217.

* cited by examiner

A

B

A

B

US 9,242,876 B2

METHODS, SYSTEMS AND MEMBRANES FOR SEPARATION OF ORGANIC COMPOUNDS FROM LIQUID SAMPLES

STATEMENT REGARDING FEDERALLY SPONSORED RESEARCH

This invention was made with government support under U.S. Navy Grant No. N61331-08-1-G001, awarded by the U.S. Department of Defense. The Government has certain rights in the invention.

BACKGROUND OF THE INVENTION

The development of new methods and systems for separating organic compounds from various liquid samples is important in many industries, including the oil and gas industry. Current methods and systems for separating organic compounds from liquid samples suffer from various limitations. Such limitations include low liquid flow rates, membrane blockage, and the need to use multiples layers of membranes. Therefore, there is currently a need to develop new methods, systems and membranes for separating organic compounds from liquid samples.

BRIEF SUMMARY OF THE INVENTION

In some embodiments, the present invention provides improved porous membranes for separating organic compounds (e.g., hydrocarbons) from liquid samples (e.g., saltwater). Such porous membranes generally comprise: (1) a plurality of pores with pore sizes of more than about 0.1 μm in diameter (e.g., 0.14 μm); and (2) a plurality of hydrophilic molecules (e.g., cysteic acid). Additional aspects of the present invention pertain to methods for separating organic compounds from a liquid sample. Such methods generally comprise: (1) providing the above-described porous membrane; and (2) flowing the liquid sample through the porous membrane to retain organic compounds on the porous membrane. In some embodiments, the flowing step may also include a filtration step. In some embodiments, the method may reduce the carbon content of the liquid sample (e.g., below about 7 ppm).

Other embodiments of the present invention pertain to systems for separation of organic compounds from a liquid sample. Such systems generally comprise: (1) the above-described porous membrane; and (2) a flowing unit that enables the liquid sample to flow through the porous membrane. In some embodiments, the flowing unit also comprises a filtration unit. In some embodiments, the flowing unit houses the porous membrane.

Additional embodiments of the present invention pertain to methods of making the above-described porous membranes. Such methods generally comprise: (1) coating a surface of a porous membrane containing 0.1 μm pores (or larger pores) with a ceramic material; and (2) associating the coated surface of the porous membrane with hydrophilic molecules.

Further embodiments of the present invention pertain to additional methods of making the above-described porous membranes. Such methods generally comprise associating the surface of a porous membrane containing 0.1 μm pores (or larger pores) with hydrophilic molecules.

As set forth in more detail below, the methods, membranes and systems of the present invention provide numerous improvements in separating various organic compounds from liquid samples. In addition, it is envisioned that the methods, membranes and systems of the present invention can provide various improved applications, including the treatment of oil-contamined sea water and the purification of frac water.

BRIEF DESCRIPTION OF THE FIGURES

In order that the manner in which the above recited and other advantages and objects of the invention are obtained, a more particular description of the invention briefly described above will be rendered by reference to specific embodiments thereof, which are illustrated in the appended Figures. Understanding that these Figures depict only typical embodiments of the invention and are therefore not to be considered limiting of its scope, the invention will be described with additional specificity and detail through the use of the accompanying Figures in which:

FIG. 1 depicts various systems for separation of organic compounds from liquid samples, in accordance with specific embodiments of the present invention.

FIG. 2A depicts a process for making a porous membrane in accordance with some embodiments of the present invention. In this embodiment, alumina-coated silica wafers are functionalized with carboxylic acids.

FIG. 2B depicts a cross-sectional view of a porous membrane containing a cysteic acid as a hydrophilic molecule. The cysteic acid is shown in its neutral and zwitterionic states.

FIG. 4A shows thermographic analysis (TGA) data relating to the porous membrane.

FIG. 4B shows a transmission electron microscopy (TEM) image of the porous membrane.

FIG. 7A is an SEM image of an unfunctionalized Nomex® membrane.

FIG. 7B is an SEM image of an alumoxane coated Nomex® membrane that has been functionalized with cysteic acid.

FIG. 7C is an SEM image of the Nomex® membrane in FIG. 7B after heat treatment.

FIG. 10A shows that, when a membrane with a large pore size is used (e.g., ~1 μm), then the membrane cannot separate the hydrocarbon molecules from water.

FIG. 10B shows that, when the membrane pore size is small enough to allow separation of hydrocarbons from water (e.g., ~5 nm), then the pores become blocked by the hydrocarbons or other materials in the mixture. In addition, a high pressure may be required, and the flow may be low.

DETAILED DESCRIPTION OF EXEMPLARY EMBODIMENTS

It is to be understood that both the foregoing general description and the following detailed description are exemplary and explanatory only, and are not restrictive of the invention, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

The section headings used herein are for organizational purposes only and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

Figure 10:
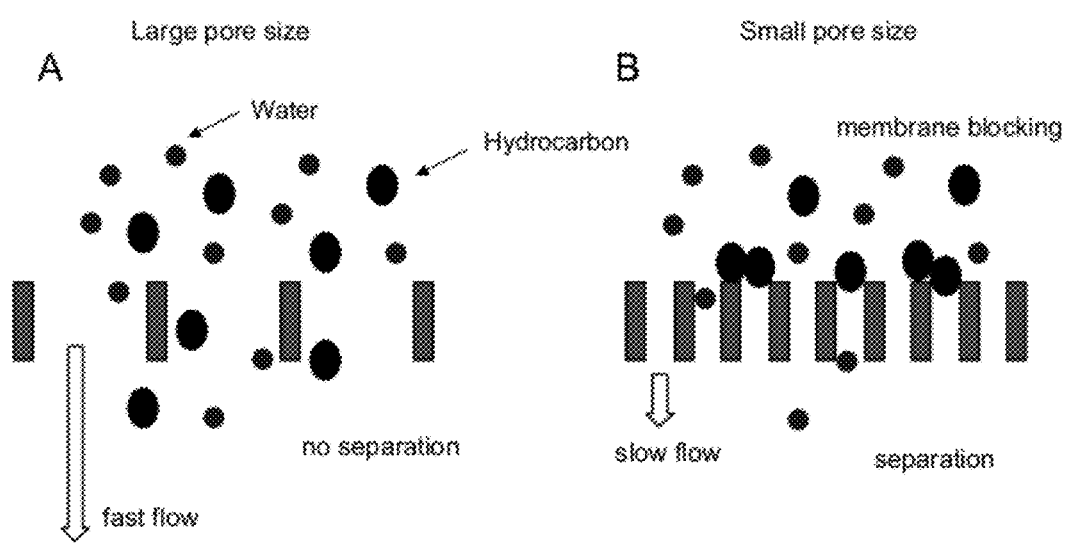
FIG. 10 shows a representation of the two problems associated with separation of hydrocarbons from water.

By way of background, oily wastewaters are an inconvenient byproduct of many industries. Ratios of hydrocarbon/water emulsions vary greatly from industry to industry. Nonetheless, oily wastewater represents a significant environmental hazard that cannot be easily assuaged. Furthermore, oily wastewater results in a significant economic drain, especially since the water must be cleaned up prior to use. Many techniques exist for the separation of these emulsions, although all have significant drawbacks to consider. See, e.g., FIG. 10.

For instance, in recent years, membrane filtration has been shown to be one of the best methods for large scale separation of oily wastewaters. This is due to processing factors, such as recyclability of throughput material in cross flow membrane assemblies, ease of cleaning, as well as highly pure permeate with no chemical tainting. A significant drawback of membrane purification is membrane fouling, which can be due to a number of factors, such as adsorption inside the membrane, deposition on the membrane surface to form a cake layer, and blocking of the membrane pores. See, e.g., FIG. 10B.

Hydrophilic membranes have been shown to achieve antifouling properties. In fact, in many ways, hydrophilic membranes are preferable over hydrophobic membranes. Without being bound by theory, it is envisioned that such properties are due to hydrophilic membranes being less sensitive to adsorption.

Accordingly, several methods, such as surface segregation, surface coating, and surface graft polymerization, have been utilized to enhance surface hydrophilicity in order to control the antifouling properties of membrane materials. However, many of these methods suffer from various limitations. For instance, ceramic membranes offer good commercializable methods for separation. However, traditionally, ceramic membranes require very small pores (<10 nm) for oil/water separation. Such small pore sizes may decrease fluid flow rate and cause clogging.

To overcome problems with decreased flow rate and clogging, the use of large membranes or high pressure may be required. Another method to overcome these problems is through a back-flush of the permeate in order to declog the membrane. However, such methods are only partially effective and present many technical burdens.

Furthermore, membranes with small pore sizes present additional issues. Generally, the use of membranes with small pore sizes for water purification requires an arrangement of multiple layers with different pore sizes. Such arrangements may lead to additional clogging problems. Such arrangements may also be expensive.

To address the aforementioned problems, one aspect of the present disclosure provides methods of separating organic compounds (e.g., hydrocarbons) from a liquid sample (e.g., saltwater). Such methods generally comprise: (1) providing a porous membrane with pore sizes of more than about 0.1 μm in diameter (e.g., 0.14 μm) that has been functionalized with hydrophilic molecules (e.g., cysteic acid); and (2) flowing the liquid sample through the porous membrane.

Other embodiments of the present invention pertain to systems for separation of organic compounds from a liquid sample. Such systems generally comprise: (1) a porous membrane as described; and (2) a flowing unit that enables the liquid sample to flow through the porous membrane. Additional embodiments of the present invention pertain to the above-described porous membranes and methods of making them.

Figure 1A:
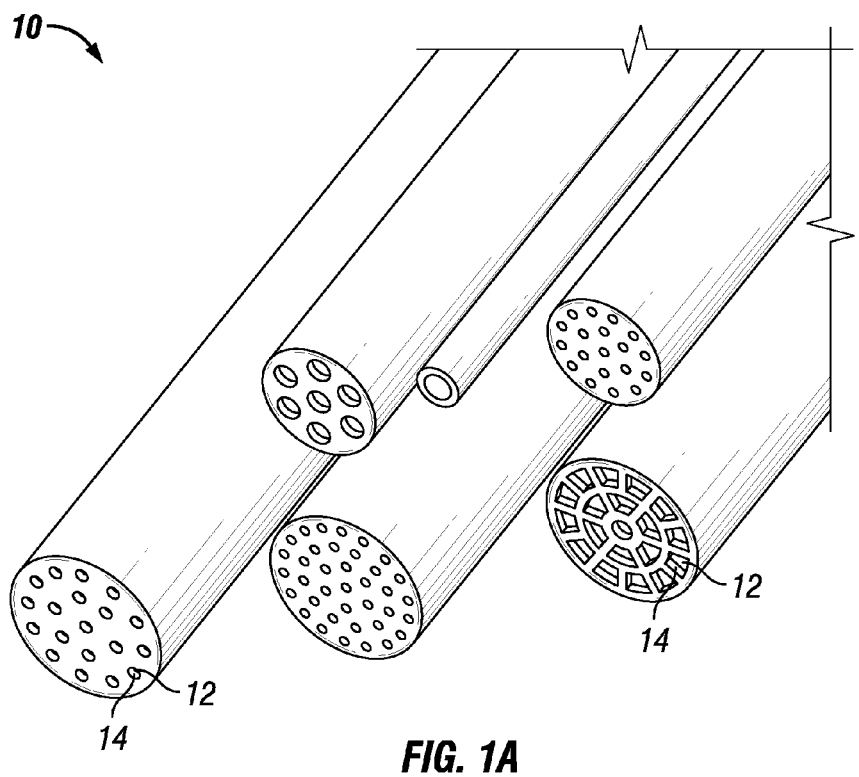
FIG. 1A depicts top views of various systems 10 showing flowing units 12 that house porous membranes 14.
Figure 1B:
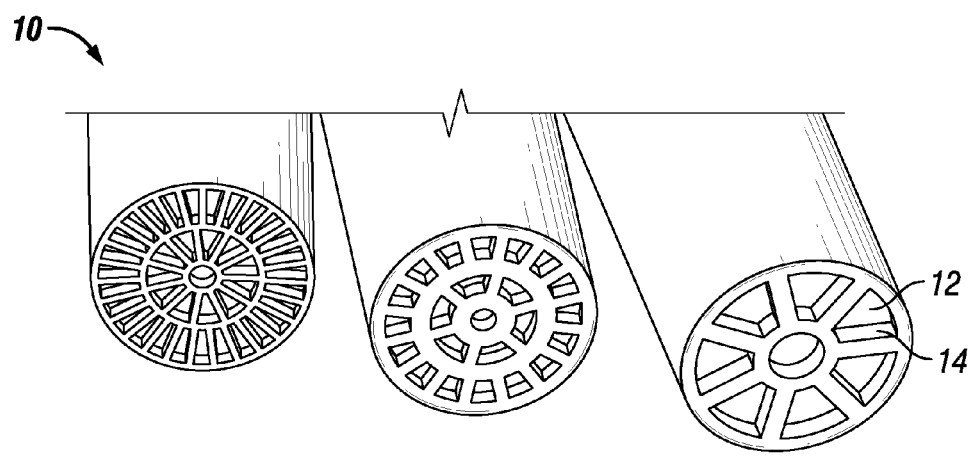
FIG. 1B depicts cross-sectional views of systems 10.
Figure 1C:
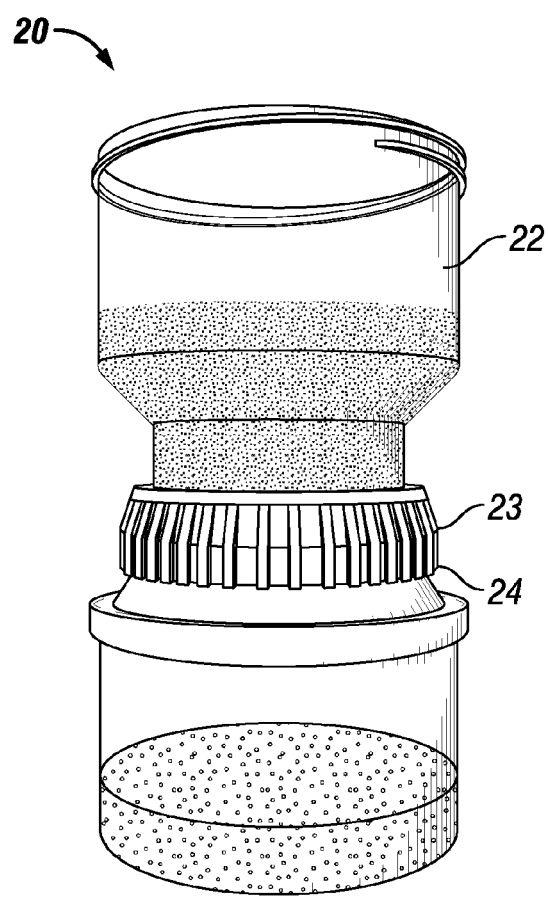
FIG. 1C depicts an alternative system 20 for separation of organic compounds from liquid samples. In this embodiment, system 20 also contains a filtration unit 23 within flowing unit 22 that houses porous membrane 24.

Specific examples of systems in accordance with various embodiments of the present invention are depicted in FIGS. 1A-1C. For instance, in the specific embodiments shown in FIGS. 1A-1B, systems 10 contain multiple flowing units 12. The flowing units house porous membranes 14 on their internal cavity walls (not shown). Porous membranes 14 in these embodiments have pores with pore sizes of about 0.14 μm in diameter. In addition, the porous membranes are functionalized with cysteic acid molecules.

In operation, liquid samples containing organic compounds flow through flowing units 12 in systems 10. This results in the retainment of organic compounds on porous membranes 14 and the release of the remaining liquid sample.

In another specific embodiment shown in FIG. 1C, system 20 contains a flowing unit 22 that also contains a filtration unit 23, which houses porous membrane 24 (not shown). In operation, liquid samples containing organic compounds flow through flowing unit 22, filtration unit 23, and porous membrane 24. The porous membrane retains organic compounds and releases the remaining liquid sample.

The aforementioned embodiments will now be discussed in more detail below. Various aspects of the methods, systems and porous membranes of the present disclosure will also be discussed with more elaboration below as specific and non-limiting examples.

Separation Systems

The systems of the present invention are designed for the separation of organic compounds from various liquid samples. Such systems generally comprise: (1) a porous membrane; and (2) a flowing unit that enables the liquid sample to flow through the porous membrane.

Porous Membranes

In general, the porous membranes of the present invention comprise: (1) multiple pores with pore sizes of more than about 0.1 µm in diameter; and (2) multiple hydrophilic molecules. The porous membranes of the present invention may be derived from various sources. For instance, in some embodiments, the porous membranes are derived from a ceramic material. In more specific embodiments, the porous membranes are ceramic membranes derived from alumina (e.g., $Al_2O_3$), titania ($TiO_2$), and/or zirconia ($ZrO_2$). However, the use of other ceramic membranes can also be envisioned by persons of ordinary skill in the art.

In more specific and preferred embodiments, porous membranes of the present invention are derived from alumoxane. In further preferred embodiments, porous membranes of the present invention are supported by a Nomex® fabric. In more specific embodiments, the porous membrane is a silica wafer coated with alumina. Other suitable porous membranes can also be envisioned by persons of ordinary skill in the art.

The porous membranes of the present invention can be associated with numerous hydrophilic molecules. Non-limiting examples of such hydrophilic molecules include carboxylic acids, acidic molecules, basic molecules, zwitterrionic molecules, phenyl amines, phenyl amidines (e.g., 1,3-diphenylamidine), amino pyridines (e.g., methylaminopyridine), and combinations thereof. In some embodiments, the porous membranes of the present invention may be associated with more than one hydrophilic molecule.

In more specific and preferred embodiments, the hydrophilic molecules associated with the porous membranes are carboxylic acids. In some embodiments, the carboxylic acid has the general formula $RCO_2H$, where R is a hydrophilic functional group. Exemplary carboxylic acids include, without limitation, cysteic acid, 3,5-diiodotyrosine, trans-fumaric acid, malonic acid, octanoic acid, stearic acid, 3,5-dihydroxybenzoic acid, parahydroxy benzoic acid, and combinations thereof. See FIG. 3. In more specific and preferred embodiments, the hydrophilic molecules on the porous membranes are cysteic acid.

The porous membranes of the present invention may also have pores of various sizes. In some embodiments, the pore sizes in the porous membrane may range from about 0.1 µm in diameter to above 10 µm in diameter. In other embodiments, the pore sizes may range from about 0.1 µm in diameter to about 1 µm in diameter. In other embodiments, the pore sizes are about 0.14 µm in diameter to about 1.4 µm in diameter. In other embodiments, the pore sizes may be greater than about 10 µm. Other suitable pore sizes can also be envisioned.

The porous membranes of the present invention may have various shapes and forms. For instance, in some embodiments, the porous membrane may consist of multiple layers (e.g., 2-8 layers, in some embodiments.) Likewise, in some embodiments, the porous membranes may be cylindrical (e.g., porous membrane 14 in FIGS. 1A-1B), flat (e.g., porous membrane 24 in FIG. 1C), or circular. In more specific embodiments, porous membranes may be in the form of nanoparticles.

In further embodiments, the porous membranes of the present invention may be about 2.5 cm in diameter and about 12 cm in length. In other embodiments, the membrane may be about 1 meter in length and about 4 meters in diameter.

Figure 2:
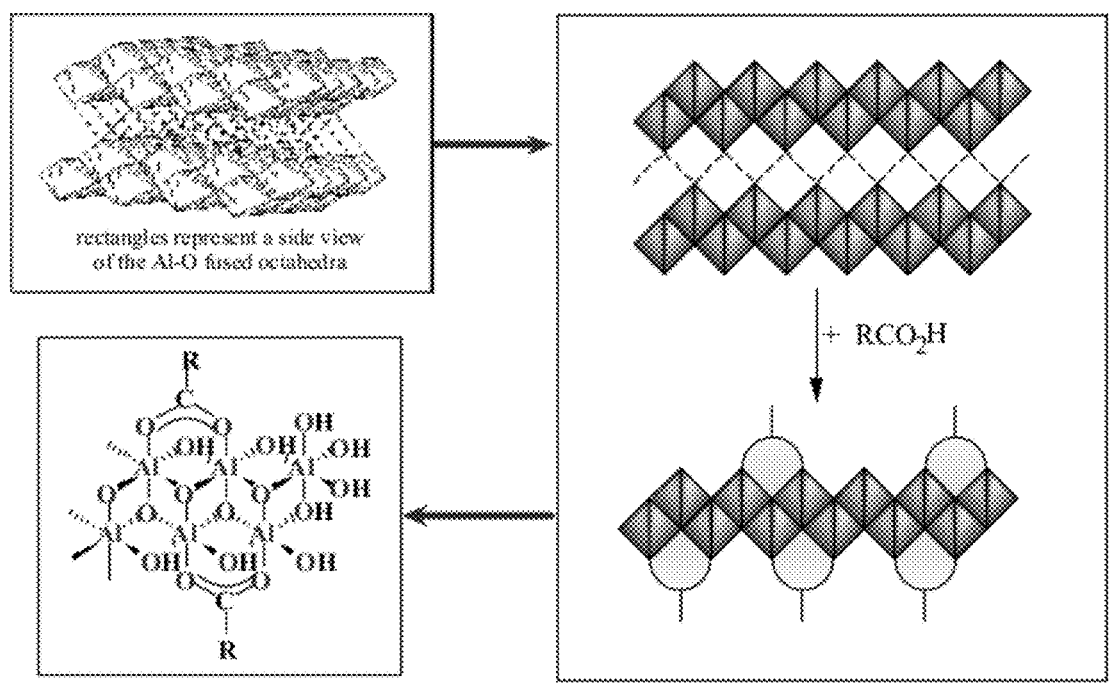
FIG. 2 depicts various aspects of exemplary porous membranes.
Figure 2:
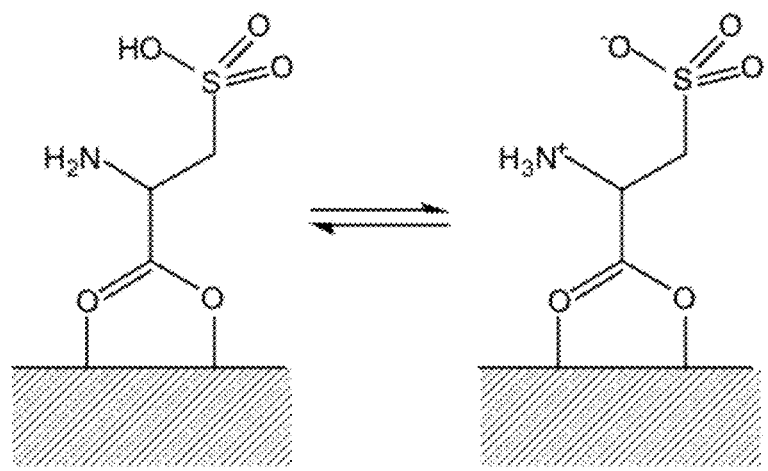

Referring now to FIG. 2A, an exemplary porous membrane is shown. In this example, the porous membrane is an alumoxane-based porous membrane that has been functionalized with a carboxylic acid. FIG. 2B illustrates the association of the carboxylic acid with the membrane in more detail. In this embodiment, the carboxylic acid is cysteic acid in zwitterionic and neutral forms.

Flowing Units

In various embodiments, the systems of the present invention may also be associated with flowing units. As used herein, flowing units generally refer to spaces or structures that enable a liquid sample to flow through a porous membrane. Such flowing units can have various shapes, structures and forms. Non-limiting examples of flowing units are shown as flowing units 12 and 22 in FIGS. 1A-1C.

In some embodiments, the flowing units of the present invention may also comprise or be associated with a filtration unit. A non-limiting example is flowing unit 22 in FIG. 1C, which is associated with a filtration unit 23. In some embodiments, the flowing unit containing the filtration unit may be a Nalgene filtration cell.

In further embodiments, the flowing unit houses the porous membrane. Examples are again shown in FIGS. 1A-1C, where flowing units 12 and 22 house porous membranes 14 and 24, respectively. Other suitable flowing units can also be envisioned by persons of ordinary skill in the art.

In additional embodiments, the flowing units of the present invention may also be associated with additional components for enhanced liquid flow. Such components can include pumps, pipes, vacuums, and/or valves. The arrangement, use and structure of such components are well known to persons of ordinary skill in the art.

Methods of Separating Organic Compounds from Liquid Samples

Other aspects of the present invention pertain to methods for separating organic compounds from a liquid sample. Such methods generally include: (1) providing a porous membrane with 0.1 µm pore sizes and hydrophilic functional groups (as described); and (2) flowing the liquid sample through the porous membrane to retain organic compounds on the porous membrane. Other methods may only include flowing a liquid sample through the above-described porous membrane in order to retain organic compounds on the porous membrane. Such methods result in the purification of the liquid sample.

In some embodiments, a substantial portion of the organic compounds in the liquid sample are retained on the porous membrane (e.g., 50-60%). In other embodiments, lower portions of the organic compounds may be retained (e.g., 15-20%).

The separation methods of the present invention can have various embodiments. For instance, various porous membranes (as previously described) may be utilized. Likewise, various flowing steps may be utilized.

Flowing Steps

In general, the flowing step involves flowing a liquid sample through a porous membrane by placing the liquid sample in contact with the porous membrane. In some embodiments, this may occur by passive flow of the liquid sample. In further embodiments, the flowing may be initiated or enhanced by a pump or other mechanical apparatus. In further embodiments, the flowing step may involve a filtration step.

Other flowing steps can also be envisioned by persons of ordinary skill in the art. For instance, in some embodiments, the separation methods of the present invention may use one or more carboxylic acid functionalized ceramic porous membranes that are mounted in a suitable separation system to allow cross-flow filtration and/or separation of a permeate containing water with solids and organic matter.

Methods of Making Porous Membranes

Additional embodiments of the present invention pertain to methods of making the above-described porous membranes. Such methods generally comprise: (1) coating a surface of a porous membrane that contain pore sizes of more than about 0.1 µm in diameter with a ceramic material (as previously described); and (2) associating the coated surface of the porous membrane with hydrophilic molecules (as also previously described). In some embodiments, the ceramic material is alumina. In some embodiments, the coating occurs by electron beam deposition methods that are well known to persons of ordinary skill in the art. In some embodiments, the hydrophilic molecule is a carboxylic acid, such as cysteic acid.

In further embodiments of the present invention, the method may further comprise a step of drying the coated surface of the porous membrane. In some embodiments, the drying occurs by heat treatment. In further embodiments, the drying occurs under acidic conditions (e.g., pH of about 2).

Further embodiments of the present invention pertain to additional methods of making the above-described porous membranes. Such methods generally comprise associating the surface of a porous membrane containing 0.1 µm pores (or larger pores) with hydrophilic molecules.

FIG. 2A depicts an exemplary method of making a porous membrane. In this example, a porous membrane is coated with alumina. This is followed by functionalization with a carboxylic acid. Other methods of making porous membranes can also be envisioned by persons of ordinary skill in the art.

Applications

The systems, membranes and methods of the present invention can be used to separate various organic compounds from various liquid samples. For instance, in some embodiments, organic compounds to be separated are hydrocarbons, such as crude oil. In some embodiments, the liquid sample may be saltwater, such as ocean water contaminated with crude oil from an oil spill.

Another application of the systems, membranes and methods of the present invention is the purification of sea water. By way of background, reverse osmosis has been a general method for desalination (removal of salt) from sea water. Unfortunately, the desalination resins are very susceptible to organic and biological matter that rapidly destroy the usefulness of the system. Using the present invention, sea water can be easily and cheaply purified of organic and biological material in order to make the desalination process more economically viable.

Other application of the present invention include the separation of polymers and inorganic materials from water. Such separation methods can find applications in numerous industrial processes.

In other embodiments, the systems, membranes and methods of the present invention may be used to purify frac water, such as frac water resulting from the hydraulic fracturing of gas containing shale reservoirs. Such applications of the present invention can be beneficial, especially in view of declining well production per acre surface density (number of wells per acre) and increases in frac water usage (as much as 1,000,000 gallons per well). In particular, the methods and systems of the present invention can be used to purify post-production frac water to remove organic contaminants. Such purified water can be re-introduced into the environment or re-used for additional frac-ing.

Advantages

Overall, the systems, membranes and methods of the present invention can be utilized to reduce the carbon content of various liquid samples. For instance, in some embodiments, the methods of the present invention may be used to reduce the carbon content of liquid samples to below about 7 ppm. As discussed below, such results provide various advantages over the systems, membranes and methods of the prior art.

For instance, as discussed in more detail below, the experimental data show that the use of ceramic membranes of the present invention reduces the pump pressure required for a particular flux from about 6-7 bar to about 2-3 bar. More importantly, the flow of permeate does not decrease over time due to minimal fouling. Furthermore, the methods and systems of the present invention may utilize porous membranes made of only one or two layers to accomplish the same results as the multi-layer systems of the prior art. Such applications also simplify the construction of the membrane, both in terms of technical and financial aspects.

While it is known that ceramic surfaces can be functionalized by carboxylic acids to alter permeate flux (speed of flow), Applicants are unaware of any prior art that such functionalization can be designed to allow a >0.1 µm membrane to separate organic materials from liquid samples. In contrast, prior art methods utilized nanometer pore sized membranes that presented many problems. In addition, there is no prior art to indicate that surface functionalization would provide a barrier to organic and biological matter.

An additional surprising result of this invention is that taking production water from a gas well that contains both inorganic particulates may be filtered to below 7 ppm total carbon content by passing the water through a 0.14 µm membrane in one pass. Analysis shows that the carbon content of the purified water is predominantly carbonate rather than organic material that cannot be detected.

Additional Embodiments

From the above disclosure, a person of ordinary skill in the art will recognize that the methods and systems of the present disclosure can have numerous additional embodiments. Reference will now be made to more specific embodiments of the present disclosure and experimental results that provide support for such embodiments. However, Applicants note that the disclosure below is for exemplary purposes only and is not intended to limit the scope of the claimed invention in any way.

EXAMPLES

Additional details about the experimental aspects of the above-described studies are discussed in the subsections below. In the Examples below, the fabrication of surface functionalized alumina fabric composite membranes using hydrophilic cysteic acid surface stabilized alumina nanoparticles (alumoxanes) were investigated. Contact angle measurements for a range of carboxylic acids functionalized onto alumina coated silicon wafers were also investigated to determine the functionalization that results in the most hydrophilic surfaces.

Highly porous Nomex® fabric was utilized as a membrane support for an alumoxane nanoparticle derived membrane filter. This filter was used for the flux differentiation studies of heavy hydrocarbons from water, and the separation of oil/water emulsions. Coating techniques utilizing pH control was also investigated. Retention coefficients and flux values indicate that surface chemistry of the fabric may be altered by coating with chemically functionalized alumina nanoparticles to provide selective flow of water versus hydrocarbons.

In broader terms, the study below involved the screening of hydrophilic membrane surfaces using static water contact angle measurement. The study below also utilized the application of fabric supported membranes for differentiation of flux rates for water and hydrocarbons with a view to its application in oil/water separation.

Example 1

Pseudoboehmite was provided by Sasol North America Inc. All carboxylate acids were obtained commercially (Aldrich) and were used as received. Nalgene filtration cells (#300-4000) were obtained from Fisher Scientific. Nomex® fabric was obtained from Pegasus Auto Racing Supplies, Inc.

EDX studies were performed on a Hitachi HD-2700 STEM scanning microscope. The samples were attached to a metal mount using carbon tape. A thin layer of gold was sputtered onto the samples to provide a conducting surface. Thermogravimetric/differential thermal analyses (TG/DTA) were obtained on a Q-600 Simultaneous TGA/DSC TA Instruments using a carrier gas of either dry nitrogen or air. SEM microscopy studies were performed on a FEI Quanta 400 ESEM. A thin layer of gold was sputtered onto the samples to provide a conducting surface. The samples were mounted on carbon tape and sputter coated with gold. TEM microscopy studies were performed on a Jeol 1230 HC-TEM 120 kV. XPS studies were conducted on a PHI Quantera XPS machines. XRD studies were conducted on Rigaku D/Max Ultima II XRD machine.

Figure 3:
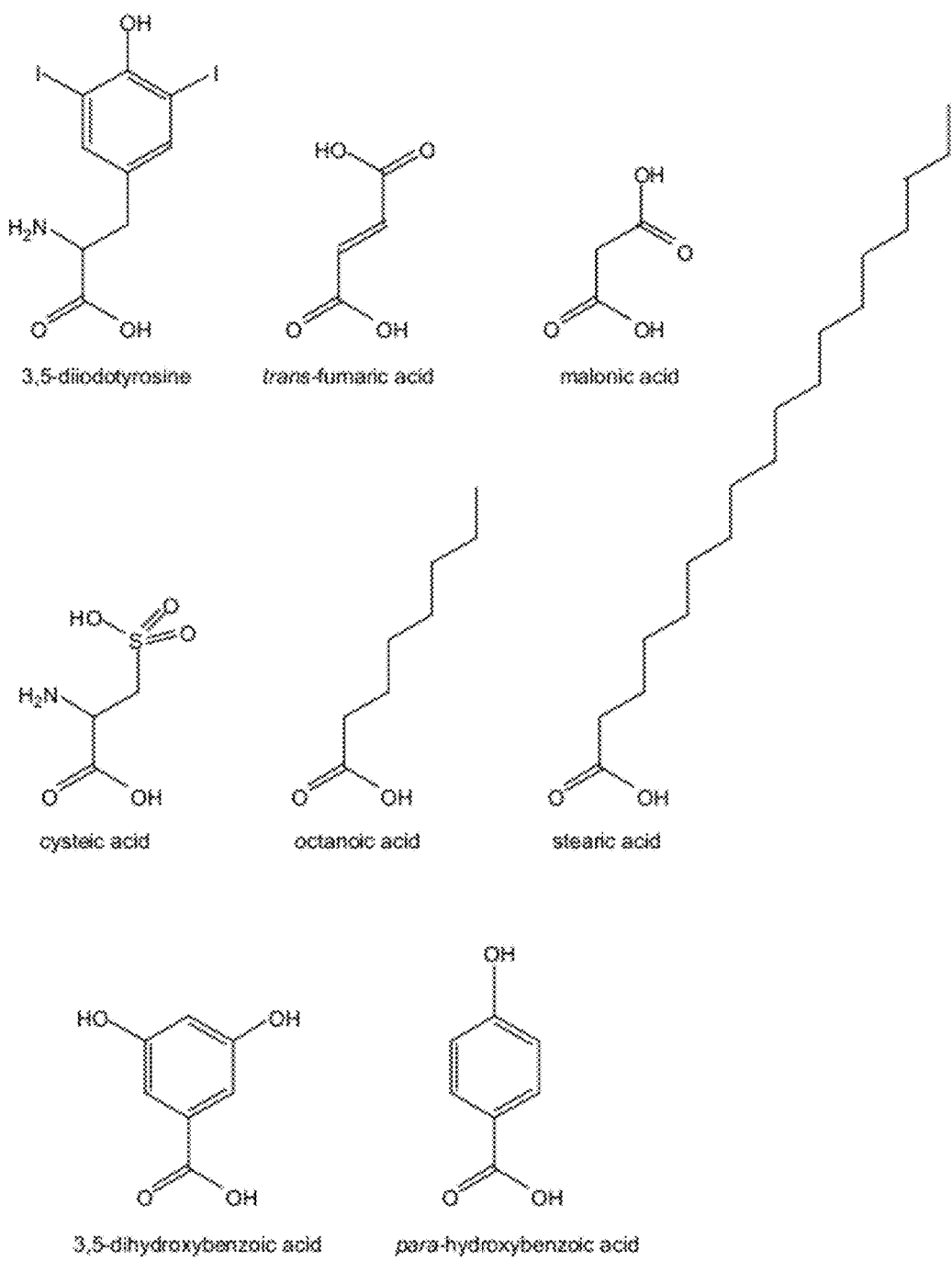
FIG. 3 shows the structure of various hydrophilic molecules that could be utilized to functionalize the porous membranes of the present invention in various embodiments.
Figure 4:
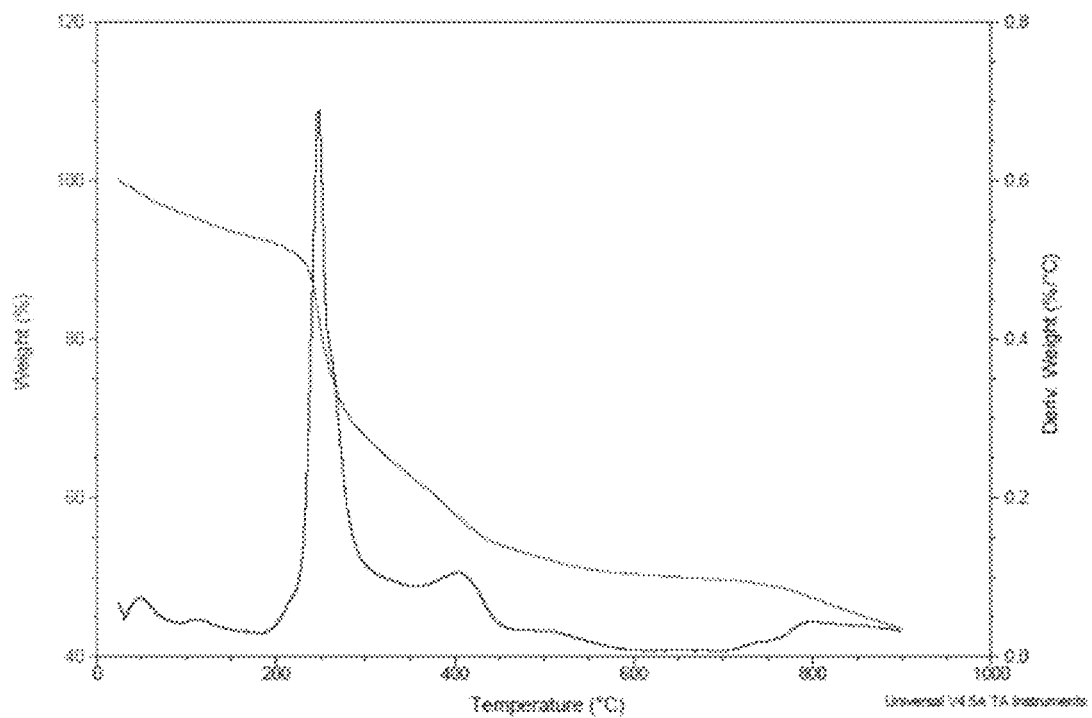
FIG. 4 shows data relating to the characterization of a cysteic acid functionalized alumoxane porous membrane.
Figure 4:
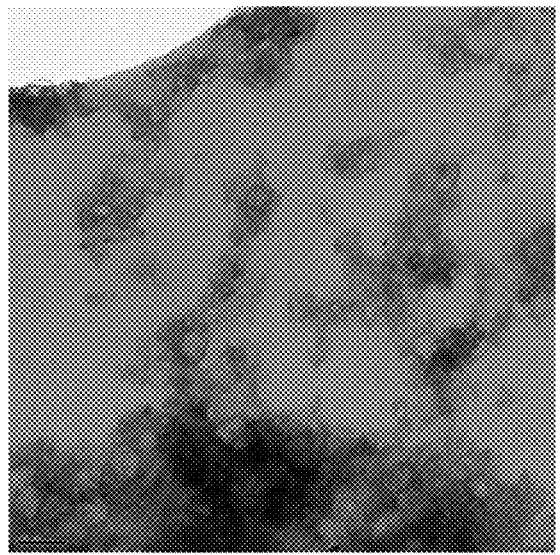

Using a modification of the literature method (C. T. Vogelson, A. Keys, C. L. Edwards, and A. R. Barron, *Molecular coupling layers formed by reactions of epoxy resins with self-assembled carboxylate monolayers grown on the native oxide of aluminum*, J. Mater. Chem., 13 (2003)291-296), silicon wafers were coated with a thin layer of alumina (100 nm) via e-beam deposition. In order to remove impurities on the alumina surface, the coated wafers were dipped in a 1:1 solution of conc. $H_2SO_4$ and 30% $H_2O_2$ for 5 min. The wafer was then washed with 2-propanol and air dried. The alumina coated silica wafer was then gently refluxed at various temperatures depending on the functionalizing carboxylic acid. After the reaction was completed, the wafers were washed with IPA and air dried. Table 1 below and FIG. 3 provide summaries of reaction conditions for carboxylic acid functionalization of alumina surfaces.

TABLE 1

Summary of reaction conditions for carboxylic acid functionalization of alumina surfaces.

| Carboxylic acid | Mass (g) | Solvent | Volume (mL) | Molarity (M) | Temperature (° C.) | Reaction time (h) |
|---|---|---|---|---|---|---|
| 3,5-diiodotyrosine | 1.87 | DMSO | 20 | 0.1 | 160 | 24 |
| trans-fumaric acid | 2.32 | EtOH | 40 | 0.5 | 60 | 24 |
| malonic acid | 2.08 | $H_2O$ | 40 | 0.5 | 105 | 24 |
| cysteic acid | 3.74 | $H_2O$ | 40 | 0.5 | 105 | 24 |
| octanoic acid | 2.90 | DMSO | 40 | 0.5 | 160 | 24 |

TABLE 1-continued

Summary of reaction conditions for carboxylic acid functionalization of alumina surfaces.

| Carboxylic acid | Mass (g) | Solvent | Volume (mL) | Molarity (M) | Temperature (° C.) | Reaction time (h) |
|---|---|---|---|---|---|---|
| stearic acid | 1.14 | $CHCl_3$ | 40 | 0.1 | 61 | 24 |
| 3,5-dihydroxybenzoic acid | 3.08 | DMSO | 40 | 0.5 | 160 | 24 |
| para-hydroxybenzoic acid | 2.76 | DMSO | 40 | 0.5 | 160 | 24 |

Synthesis of Cysteic Acid Alumoxane

Figure 5:
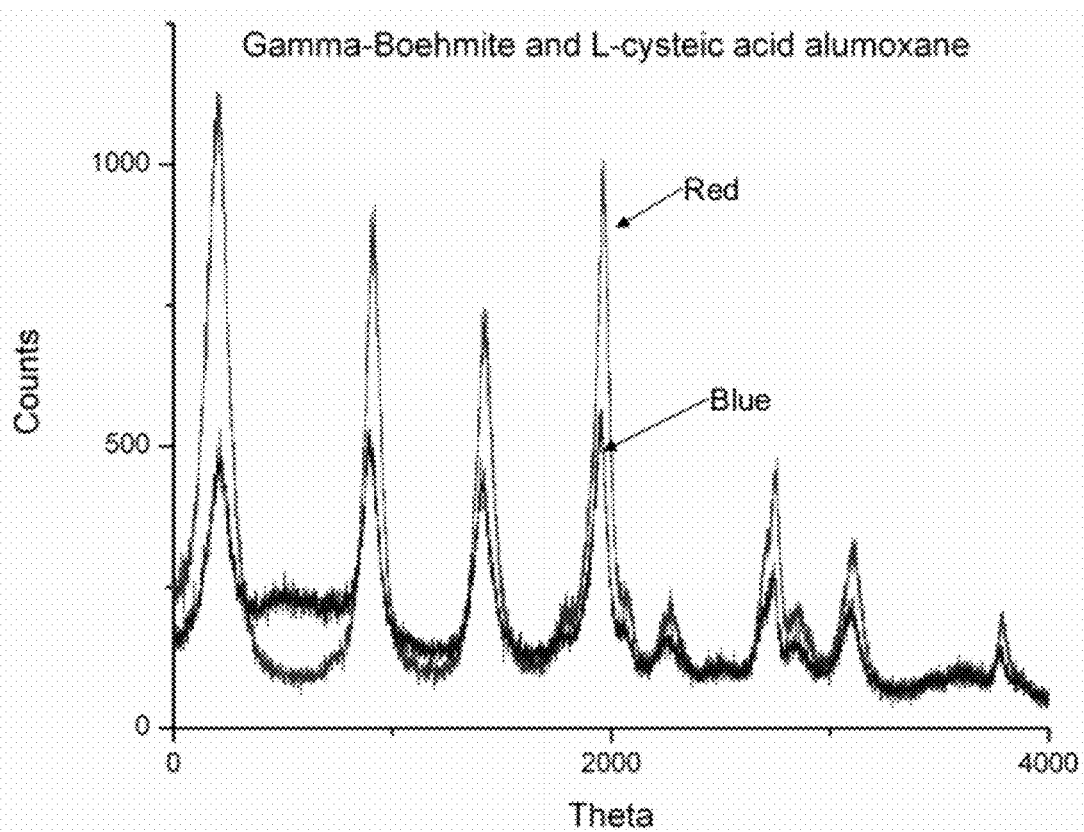
FIG. 5 shows comparative x-ray diffraction (XRD) patterns of bohemite (red) and a cysteic acid functionalized alumoxane porous membrane (blue).
Figure 6:
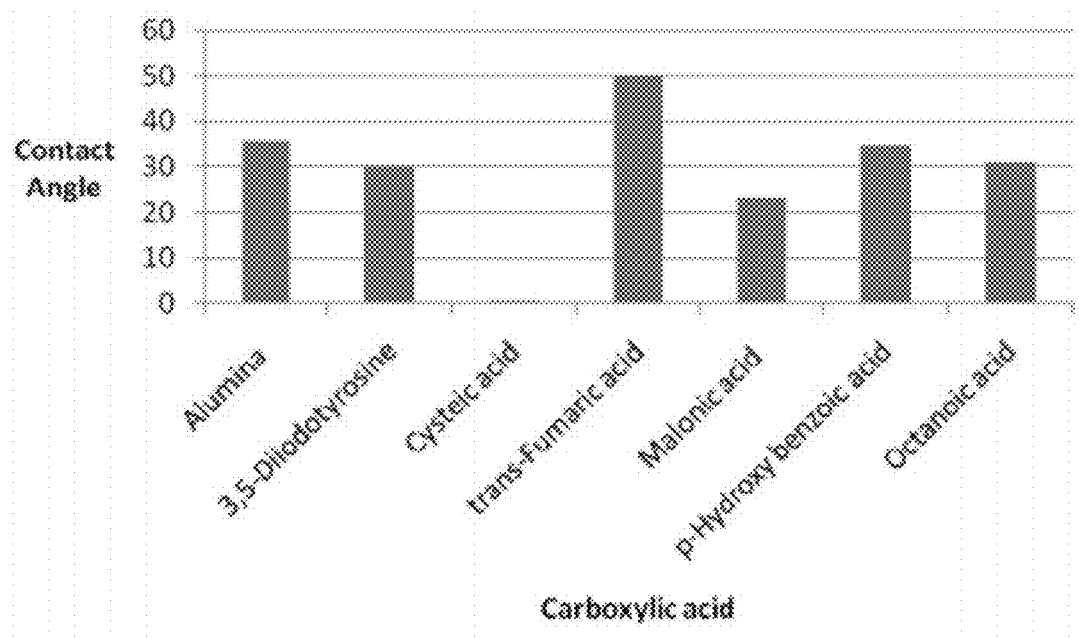
FIG. 6 shows contact angle measurements for water on various alumina porous membrane surfaces that were functionalized with various carboxylic acids.
Figure 7:
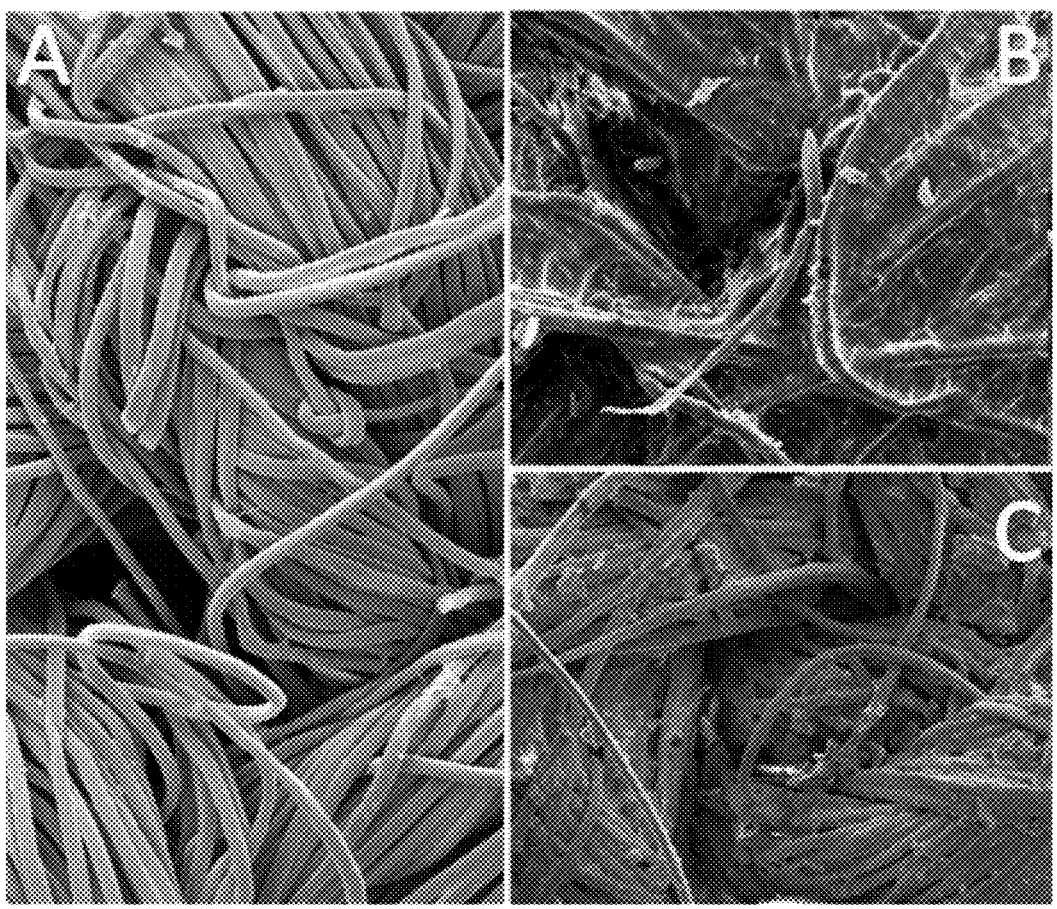
FIG. 7 shows scanning electron microscopy (SEM) images of alumoxane coated Nomex® membranes treated under various conditions.

In a modification of the literature procedures (R. L. Callender, C. J. Harlan, N. M. Shapiro, C. D. Jones, D. L. Callahan, M. R. Wiesner, R. Cook, and A. R. Barron, Aqueous synthesis of water soluble alumoxanes: environmentally benign precursors to alumina and aluminum-based ceramics, Chem. Mater., 9 (1997) 2418-2433; R. L. Callender and A. R. Barron, Facile synthesis of aluminum containing mixed metal oxides using doped carboxylate-alumoxane nanoparticles, J. Am. Ceram. Soc., 83 (2000) 1777; N. Shahid and A. R. Barron, Solvent free synthesis of carboxylate-alumoxane nanoparticles using mechanical shear, J. Mater. Chem., 14 (2004)1235-1237), pseudoboehmite (100 g) was vigorously stirred in DI $H_2O$ (80 mL). To this solution was slowly added an aqueous 1 M solution of cysteic acid (80 mL). The resulting solution was allowed to stir overnight, and then centrifuged at 4500 rpm for 1 hour. The ceramic yield (55%) and the average particle size (17 nm) were determined by TGA and TEM, respectively. See FIGS. 5-6. The hydrated solid was used in future dip coatings of Nomex material Nomex® fabric (18 $cm^2$) was washed sequentially with EtOH and acetone to remove excess dye and surface contaminants. The fabric was then vacuum-dried and then dip-coated in a 20 wt % aqueous solution of cysteic acid-alumoxane solution (10 g in 50 mL DI $H_2O$) and held there for 2-5 seconds. The dip-coat was allowed to oven dry (100° C.) before repeating the procedure. The fabric was loaded with 5 g of cysteic acid alumoxane per 18 $cm^2$. See FIG. 7.

Retention Studies by Gravity Filtration

The cysteic acid functionalized alumoxane Nomex composite membrane was cut to 5.5 cm diameter circle and fitted into the Nalgene filtration cell. The desired solution/emulsion (250 mL) was poured on top of the mounted support. The concentration of the initial feed was compared to the concentration of permeate overtime to determine the percentage of retention. Initially, this was achieved through inspection for larger $M_w$ hydrocarbons. For smaller weight hydrocarbons (including Dextrans), GC-mass spectral analysis was used. This methodology was used for all solution studies presented herein.

Previous work suggested that para-hydroxybenzoic acid functionalization would make an alumina surface slightly more hydrophilic. The initial goal was to compare a range of functional carboxylic acids. Each of the carboxylic acids were functionalized onto the alumina coated silica wafers to allow for ready comparison by contact angle measurements. The surfaces were tested using goniometer contact angle techniques. From this it was observed that cysteic acid functionalized alumina coated wafers were extremely hydrophilic, achieving complete wetability when in contact with water. See FIGS. 2A-2B. Without being bound by theory, it is envisioned that such hydrophilic attributes were due to the hydrogen bonding abilities of both sulfonyl and amine moieties on functionalized cysteic acid and its zwitterionic adducts. See FIG. 2B. Based on these results, cysteic acid was chosen as the preferred candidate for the creation of hydrophilic alumoxane Nomex composite membranes.

Deposition of zwitterionic polymers has been utilized in previous work by other groups. However, deposition of a polymer onto a surface is difficult to control. Furthermore, polymers are susceptible to degradation. Moreover, polymer deposition is prone to exponential loss in hydrophilicity when degradation occurs. By placing a zwitterionic molecule onto the surface of a inorganic nanoparticle, many advantages are achieved. Such advantages include the control of deposition and subsequent controlled coating of Nomex fibers. Degradation of hydrophilicity is also lessened by comparison to polymerization due to the functionalization being solely molecular. This ensures that loss of the zwitterionic molecule from a nanoparticle does not mean a loss of hydrophilicity of that nanoparticle.

In the above-described studies, cysteic acid was utilized as the zwitterionic molecule. The dissociation constant of the sulfonyl proton in cysteic acid is high, with a pKa of about 1.3. However, the amine moiety in cysteic acid is quite basic with a pKa of about 9.2. This results in the formation of a zwitterion. The zwitterion can form multiple hydrogen bonds, thus making the surface of the alumoxane nanoparticles hydrophilic.

It had been shown in earlier work that the average particle size of Boehmite starting material is nearly two orders of magnitude larger than the cysteic acid alumoxane particles (i.e., 3000 nm versus 30 nm). Thus, the presence of un-reacted Boehmite can alter the resulting pore size formation and increase the variance of the pore size distribution. Removal of un-reacted Boehmite from the cysteic acid alumoxane solution by centrifugation reduced the average particle size. The mean particle size before and after centrifugation was 120 nm and 18 nm, respectively. See FIG. 5.

In order to demonstrate that surface functionalization and not pore size is responsible for any chemical separations, Applicants chose to use Nomex® fabric as a support. Applicants reasoned that the large weave (i.e. pore throat size) of such Nomex® fabrics will not facilitate separation. Fabrication of the membrane was achieved by bringing the surface of the support into contact with a solution of cysteic acid functionalized alumoxane. The solution was drawn into the surface pores of the support by capillary forces. The membrane deposited onto the surface of the support is preferably uniformly thin throughout in order to maximize the flux, which is important when the pore size of the membrane is significantly smaller than the pore size of the support. Applicants' studies used commercially available Nomex® as support for forming the alumoxane-derived membranes. The membrane thickness was controlled by the concentration of the cysteic acid alumoxane precursor. A concentration of 20 wt. % cysteic acid alumoxane produces satisfactory coverage. See FIG. 7.

Figure 8:
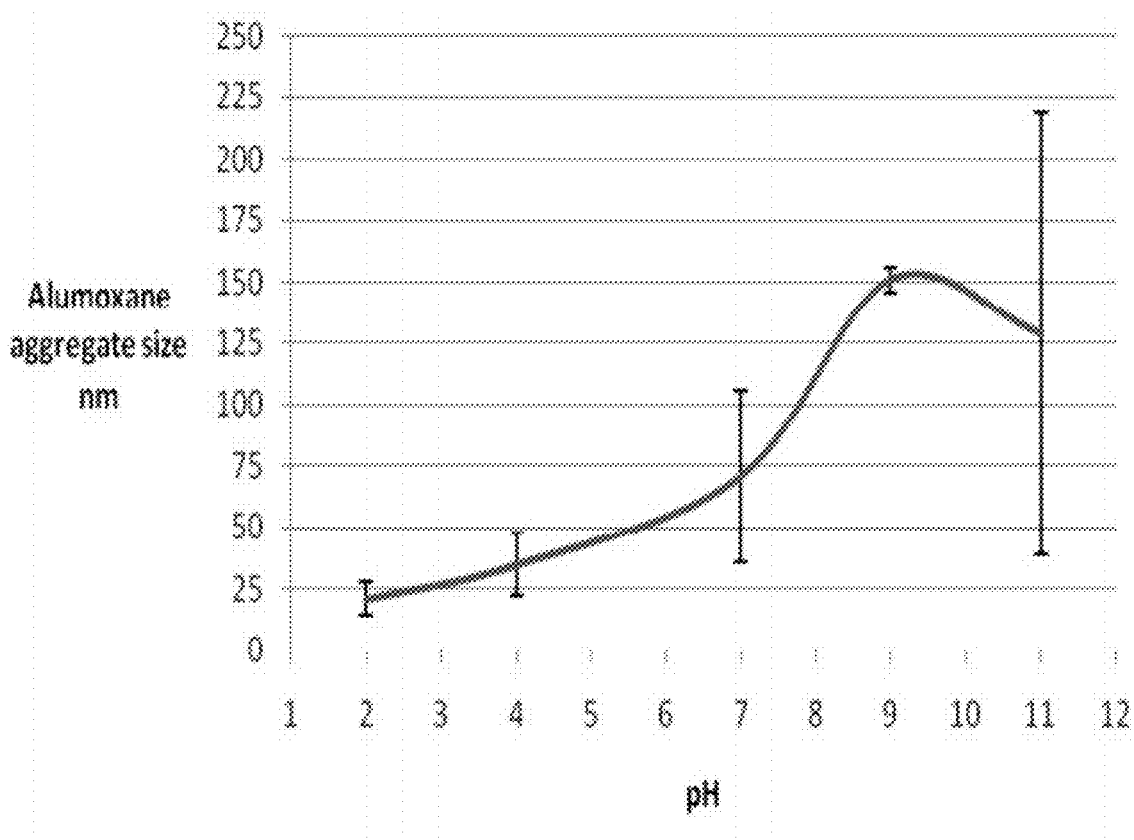
FIG. 8 shows the aggregation size pattern of cysteic acid functionalized alumoxane porous membranes that were dried under different pH levels.

In previous work, the pH of the reaction solution for alumoxane was measured to be 4.5. This was deemed to be important in the synthesis of homogenous 17 nm alumoxane nanoparticles. In this work, investigation of coating formation was deemed to be important for the application of dip coating a fabric containing a large surface area which might be influenced by its acidity level. The acidity level could in turn influence the drying pattern of the membrane. Thus, the uniform coating of each fiber may be effected. It was found that drying cysteic acid alumoxane solution at different pH levels at 100° C. resulted in significantly different drying patterns. It was also found that drying cysteic acid alumoxane at acidic pH resulted in significantly more homogenous drying patterns as well as smaller agglomerations compared to basic pH. See FIG. 8. This is a significant factor in uniformly coating Nomex® scaffold. Optimal coating of the scaffold occurred at a pH of around 2, which resulted in fine 25 nm aggregates.

Figure 9:
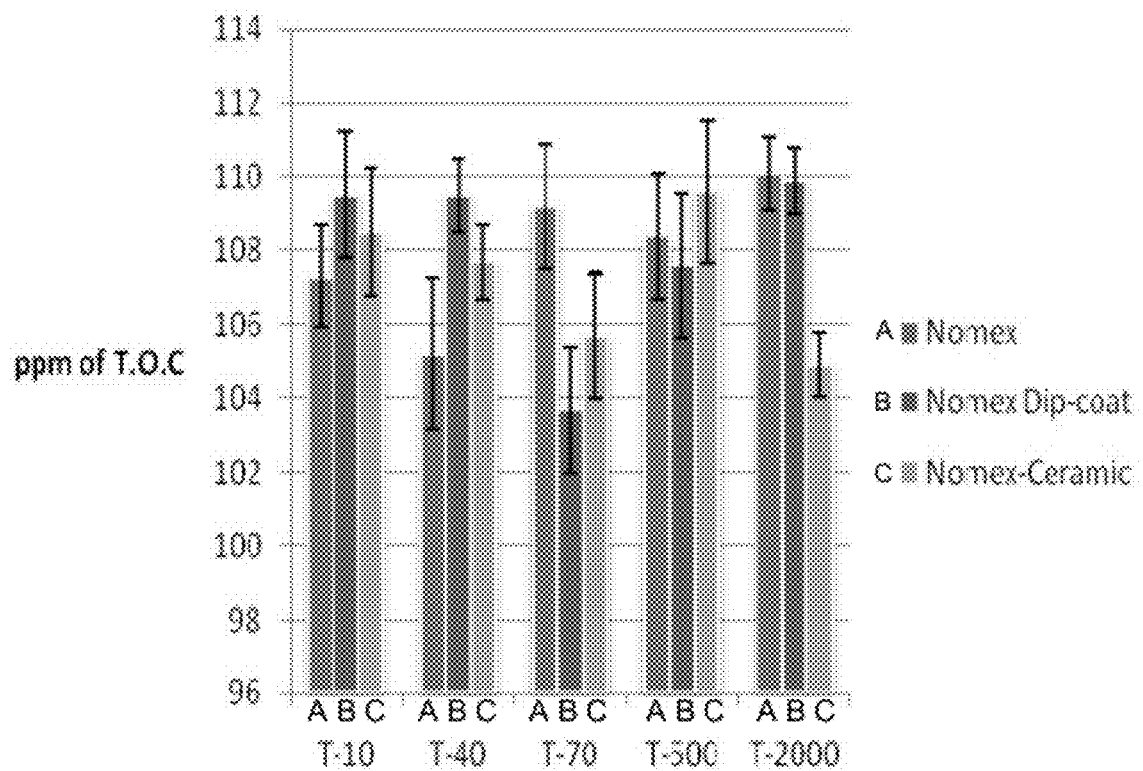
FIG. 9 shows the total organic carbon (TOC) measurements of various types of Nomex membranes. Type A is untreated Nomex, Type B is Nomex dip-coated in a cysteic acid functionalized alumoxane nanoparticle solution, and Type C is Nomex dip-coated in cysteic acid functionalized alumoxane and heated to partially convert to a ceramic coating.

Given the improved synthesis of small, highly uniform alumoxane particles and their aggregates, and the subsequent formation of alumina coated membranes, Applicants have prepared a membrane using new cysteic acid alumoxane nanoparticles. Permeate flux and permeability measurements were performed as well as size exclusion experiments to determine if the functionalized membrane operates as an entropic barrier, or whether size exclusion occurs. See FIG. 9 and Table 2.

TABLE 2

Dextran molecules used for testing pore size.

| Dextran | Average molecular weight g/mol$^{-1}$ | $D_s$ (nm) |
|---|---|---|
| T-10 | 10500 | 1.8-3 |
| T-40 | 37500 | 4-6 |
| T-70 | 67800 | 6-9 |
| T-500 | 413000 | 15-19 |
| T-2000 | 1652000 | 27 |

Separation of Hydrocarbon Molecules

Analysis of relevant eluants was performed using 250 mL of each sample. Pure eluants and mixtures were tested. Emulsions of eluants were made in a 1:1 ratio with D.I. water and brine. For the D.I. water emulsion, no elution was observed for automotive oil as this formed a stable emulsion which didn't separate. However, for brine emulsions, brine was eluted but car oil was not. This is due to the fact that brine does not form stable emulsions and tends to separate organic and aqueous layers, a phenomenon which is used often in organic chemistry to separate aqueous and organic layers. See Table 3.

TABLE 3

Time testing of hydrocarbons and hydrocarbon emulsions.

| Eluant | Time (s) functionalized Nomex ™ | Time (s) non-functionalized Nomex ™ |
|---|---|---|
| D.I. Water | 53 | 48 |
| Brine | 58 | 55 |
| Hexadecane | 278 | 163 |
| Oleic Acid | 14784 | 1076 |
| Automotive Oil | No Elution after 24 hrs | 4381 |
| D.I. Water:Automotive Oil 1:1 Emulsion | No elution of emulsion | 190 |
| D.I. Water:Oleic Acid 1:1 Emulsion | 8954 | 197 |
| Brine:Automotive Oil 1:1 | Only elution of separated brine not emulsion | 9699 |
| Brine:Oleic Acid 1:1 | 9240 | 3228 |

Table 4 below provides a summary of the characteristics of the hydrocarbons and the concentrations employed in this study. Standard emulsions of each hydrocarbon were prepared in aqueous solution. The emulsions were passed through a dead-end filtration system. From inspection, the volumetric flux and flow rates are exponentially higher for aqueous systems compared to hydrocarbon.

TABLE 4

Volumetric flow and flux rate calculations.

| Test membrane | Eluant | pH of Eluant | Time to elute (s) | Volumetric flow rate (m³/s) | Volumetric flux (m/s) |
|---|---|---|---|---|---|
| Cysteic acid-alumoxane-Nomex | D.I. Water | 7 | 53 | 5E−06 | 2.10E−07 |
| Cysteic acid-alumoxane-Nomex | Brine | 7 | 58 | 4E−06 | 1.68E−07 |
| Cysteic acid-alumoxane-Nomex | Hexadecane | 7 | 278 | 9E−07 | 3.79E−08 |
| Cysteic acid-alumoxane-Nomex | Oleic acid | 7 | 14784 | 2E−08 | 8.41E−10 |
| Cysteic acid-alumoxane-Nomex | Brine:Oleic acid | 7 | 9240 | 3E−08 | 1.26E−09 |

Example 2

Figure 11:
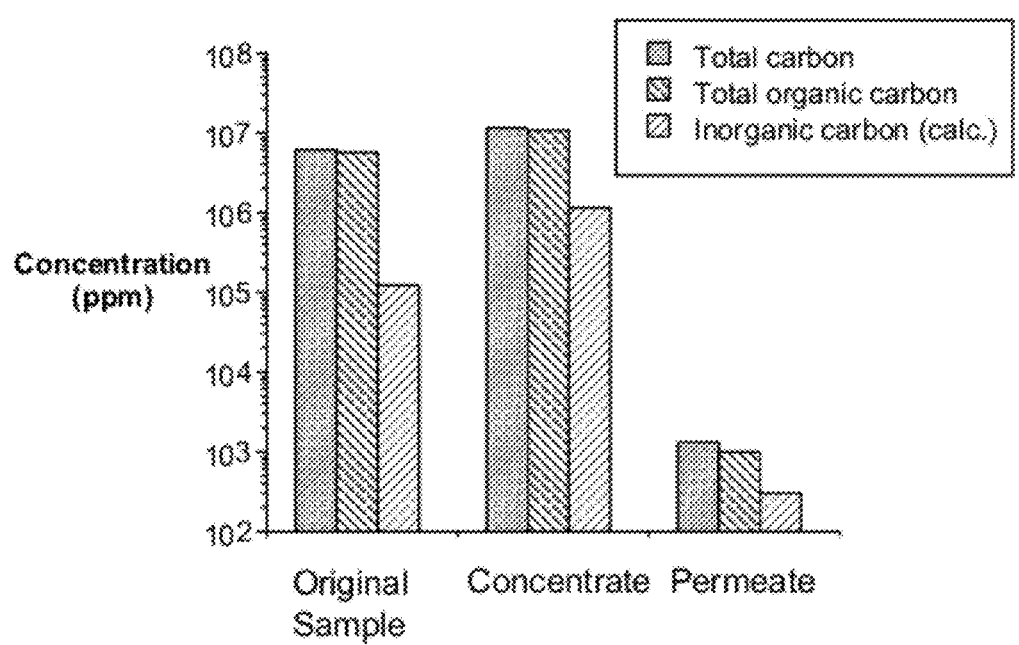
FIG. 11 shows a plot of the total carbon, total organic carbon, and calculated inorganic carbon for a sample of frac (production) water before filtration with a 0.14 μm membrane. Corresponding data for the concentrate and the permeate are also shown.

TGA analysis was conducted on a TA Instruments Q-600 simultaneous TGA/DSC machine. Analysis was conducted on TA Instruments analysis software. Relative atomic percentages of surface chemistry were conducted on a PHI quantera XPS machine. Data was collated using a Multipak software. XRD analysis was conducted on a Rigaku D/Max Ultima II configured with a vertical theta/theta goniometer, Cu Ka radiation, graphite monochromator, and scintillation counter. JADE 8.5 data processing software was used to collate and analyze the XRD data. SEM analysis was conducted on FEI Quanta 400, a multiple stage high resolution field emission environmental scanning electron microscope (ESEM), both in scanning electron (SE) mode and energy dispersive X-ray scattering (EDS) mode. Filtration experiments were conducted on a single pass-closed loop batch system. Organic carbon content of original, permeate and concentrate frac water samples were degassed under argon for 30 mins and then analyzed for both total carbon and total organic carbon using an Agilent carbon analysis machine. See FIG. 11. Analysis of molecular mass of original permeate and concentrate was extracted using liquid-liquid extraction techniques. The chloroform extract was analyzed using an Agilent GC-MS with an Ar carrier gas.

As is pristine ceramic filtration membrane was immersed in a 1:1 solution of concentrated $H_2SO_4$ and 30% $H_2O_2$ (Piranha acid) for 15 mins. The membrane was sonicated sequentially for 30 mins with water. The membrane was then re-immersed in piranha acid for a further 5 mins. The membrane was then sonicated again for a further 30 mins with DI water. The ceramic membranes were then immersed in a 1 M aqueous solution of L-cysteic acid. The solution and ceramic membranes were placed under vacuum to remove any remaining air bubbles inside the ceramic cavity. Once the solution and membrane stopped effervencing, the membrane was refluxed at 120° C. for three days. The membrane was then sequentially washed with D. I water and sonicated for 30 mins. Next, the membrane was washed for another 30 mins, with aceton and allowed to dry.

SUMMARY

Applicants have demonstrated from the above results that they have synthesized a hydrophilic membrane that is capable of screening hydrocarbons from hydrocarbon/water emulsions. Without being bound by theory, Applicants envision that the above results are due to the functionalized alumoxane nanoparticles, and the zwitterionic cysteic acid molecules that allows efficient hydrogen bonding to the water droplets within the emulsions studied. Applicants envision that this interaction allows formation of an aqueous layer on the surface of the filter, which helps prevent fouling and more importantly provides an entropic barrier for which the oil droplets contained within the emulsions studied cannot cross. The meniscus of the aqueous layer may in fact decrease the pore size for hydrophobic material. However, utilization of pores with diameters of more than about 1 µm should obviate any flow problems.

Without further elaboration, it is believed that one skilled in the art can, using the description herein, utilize the present invention to its fullest extent. The embodiments described herein are to be construed as illustrative and not as constraining the remainder of the disclosure in any way whatsoever. While the preferred embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

REFERENCES

C. T. Vogelson, A. Keys, C. L. Edwards, and A. R. Barron, Molecular coupling layers formed by reactions of epoxy resins with self-assembled carboxylate monolayers grown on the native oxide of aluminum, *J. Mater. Chem.*, 13 (2003) 291-296.

R. L. Callender, C. J. Harlan, N. M. Shapiro, C. D. Jones, D. L. Callahan, M. R. Wiesner, R. Cook, and A. R. Barron, Aqueous synthesis of water soluble alumoxanes: environmentally benign precursors to alumina and aluminum-based ceramics, *Chem. Mater.*, 9 (1997) 2418-2433.

R. L. Callender and A. R. Barron, Facile synthesis of aluminum containing mixed metal oxides using doped carboxylate-alumoxane nanoparticles, *J. Am. Ceram. Soc.*, 83 (2000) 1777.

N. Shahid and A. R. Barron, Solvent free synthesis of carboxylate-alumoxane nanoparticles using mechanical shear, *J. Mater. Chem.*, 14 (2004) 1235-1237.

C. D. Jones, D. A. Bailey, M. R. Wiesner, and A. R. Barron, Carboxylate-alumoxanes: environmentally benign precursors for developing aluminum based ceramic membranes and filter. *9th CIMTEC—World Ceramics Congress, Ceramics Getting into the 2000—Part D*, 1999, 413.

D. A. Bailey, C. D. Jones, A. R. Barron, and M. R. Wiesner, Characterization of alumoxane-derived ceramic membranes. *J. Membrane Sci.*, 2000, 176, 1-9.

C. D. Jones, M. Fidalgo, M. R. Wiesner, and A. R. Barron, Alumina ultrafiltration membranes derived from carboxylate-alumoxane nanoparticles, *J. Membrane Sci.*, 2001, 193, 175-184.

K. A. DeFriend, M. R. Wiesner, and A. R. Barron, Alumina and aluminate ultrafiltration membranes derived from alumina nanoparticles. *J. Membrane Sci.*, 2003, 224, 11-28.

K. A. DeFriend and A. R. Barron, A simple approach to hierarchical ceramic ultrafiltration membranes. *J. Membrane Sci.*, 2003, 212, 29-38.

M. M. Cortalezzi, J. Rose, A. R. Barron, and M. R. Wiesner, Characteristics of ultrafiltration ceramic membranes derived from alumoxane nanoparticles. *J. Membrane Sci.,* 2002, 205, 33-43.

M. M. Cortalezzi-Fidalgo, J. Rose, G. F. Wells, J.-Y. Bottero, A. R. Barron, and M. R. Wiesner, Ceramic membranes derived from ferroxane nanoparticles: a new route to the fabrication of iron oxide ultrafiltration membranes. *J. Membrane Sci.,* 2003, 227, 207-217.

M. R. Wiesner, A. R. Barron and J. Rose, in *Environmental Nanotechnology: Applications and Impacts of Nanotechnology,* Ed. M. R. Wiesner and J.-Y. Bottero, McGraw Hill, New York, 2007.

PATENTS

U.S. Pat. No. 7,913,857, Selective membrane having a high fouling resistance
U.S. Pat. No. 7,867,417, Membrane post treatment.
U.S. Pat. No. 7,655,277, Titania composite membrane for water/alcohol separation, and preparation thereof.
U.S. Pat. No. 5,520,815, Process for removal of lead and oil contaminants from machining coolant solutions

What is claimed is:

1. A method for separation of organic compounds from a liquid sample, wherein the method comprises:
   a. providing a ceramic porous membrane comprising:
      i. a plurality of pores with pore sizes of more than about 0.1 µm in diameter, and
      ii. a plurality of hydrophilic molecules, wherein the hydrophilic molecules comprise zwitterionic molecules linked to the ceramic porous membrane through carboxylic acid groups on the zwitterionic molecules; and
   b. flowing the liquid sample through the ceramic porous membrane, wherein the flowing retains organic compounds on the ceramic porous membrane.

2. The method of claim 1, wherein the organic compounds comprise hydrocarbons.

3. The method of claim 1, wherein the liquid sample comprises saltwater.

4. The method of claim 1, wherein the pores in the ceramic porous membrane have pore sizes of about 0.14 µm in diameter.

5. The method of claim 1, wherein the hydrophilic molecules in the ceramic porous membrane are selected from the group consisting of carboxylic acids, acidic molecules, basic molecules, phenyl amines, phenyl amidines, amino pyridines, and combinations thereof.

6. The method of claim 1, wherein the hydrophilic molecules in the ceramic porous membrane comprise carboxylic acids selected from the group consisting of cysteic acid, 3,5-diiodotyrosine, trans-fumaric acid, malonic acid, octanoic acid, stearic acid, 3,5-dihydroxybenzoic acid, parahydroxy benzoic acid, and combinations thereof.

7. The method of claim 1, wherein the method reduces the carbon content of the liquid sample to below about 7 ppm.

8. The method of claim 1, wherein the flowing step comprises a filtration step.

9. The method of claim 1, wherein the ceramic porous membrane comprises at least one of alumina, titania, and zirconia.

10. The method of claim 1, wherein the zwitterionic molecules comprise functionalized carboxylic acids.

11. The method of claim 1, wherein the zwitterionic molecules comprise cysteic acid.

12. A method for separation of organic compounds from a liquid sample,
   wherein the method comprises flowing the liquid sample through a ceramic porous membrane,
   wherein the ceramic porous membrane comprises:
      a plurality of pores with pore sizes of more than about 0.1 µm in diameter, and
      a plurality of hydrophilic molecules, wherein the hydrophilic molecules comprise zwitterionic molecules linked to the ceramic porous membrane through carboxylic acid groups on the zwitterionic molecules, and
   wherein the flowing retains organic compounds on the ceramic porous membrane.

13. The method of claim 12, wherein the organic compounds comprise hydrocarbons.

14. The method of claim 12, wherein the liquid sample comprises saltwater.

15. The method of claim 12, wherein the hydrophilic molecules in the ceramic porous membrane comprise carboxylic acids selected from the group consisting of cysteic acid, 3,5-diiodotyrosine, trans-fumaric acid, malonic acid, octanoic acid, stearic acid, 3,5-dihydroxybenzoic acid, parahydroxy benzoic acid, and combinations thereof.

16. The method of claim 12, wherein the flowing step comprises a filtration step.

17. The method of claim 12, wherein the ceramic porous membrane comprises at least one of alumina, titania, and zirconia.

18. The method of claim 12, wherein the zwitterionic molecules comprise functionalized carboxylic acids.

19. The method of claim 12, wherein the zwitterionic molecules comprise cysteic acid.

20. A system for separation of organic compounds from a liquid sample, wherein the system comprises:
   a. a ceramic porous membrane comprising:
      i. a plurality of pores with pore sizes of more than about 0.1 µm in diameter, and
      ii. a plurality of hydrophilic molecules, wherein the hydrophilic molecules comprise zwitterionic molecules linked to the ceramic porous membrane through carboxylic acid groups on the zwitterionic molecules; and
   b. a flowing unit, wherein the flowing unit enables the liquid sample to flow through the ceramic porous membrane.

21. The system of claim 20, wherein the ceramic porous membrane comprises at least one of alumina, titania, and zirconia.

22. The system of claim 20, wherein the pores in the ceramic porous membrane have pore sizes of about 0.14 µm in diameter.

23. The system of claim 20, wherein the hydrophilic molecules in the ceramic porous membrane are selected from the group consisting of carboxylic acids, acidic molecules, basic molecules, phenyl amines, phenyl amidines, amino pyridines, and combinations thereof.

24. The system of claim 20, wherein the hydrophilic molecules in the ceramic porous membrane comprise carboxylic acids selected from the group consisting of cysteic acid, 3,5-diiodotyrosine, trans-fumaric acid, malonic acid, octanoic acid, stearic acid, 3,5-dihydroxybenzoic acid, parahydroxy benzoic acid, and combinations thereof.

25. The system of claim 20, wherein the flowing unit comprises a filtration unit.

26. The system of claim 20, wherein the flowing unit houses the ceramic porous membrane.

27. The system of claim 11, wherein the zwitterionic molecules comprise functionalized carboxylic acids.

28. The system of claim 11, wherein the zwitterionic molecules comprise cysteic acid.

* * * * *